July 26, 1966　　D. E. JOHNSON, JR　　3,262,208
DENTAL MATRIX DEVICE
Filed Oct. 2, 1963

INVENTOR
DEWEY E. JOHNSON, JR.

BY　*B. P. Vishlume, Jr.*
ATTORNEY

United States Patent Office 3,262,208
Patented July 26, 1966

3,262,208
DENTAL MATRIX DEVICE
Dewey E. Johnson, Jr., 112 Folly Road, Charleston, S.C.
Filed Oct. 2, 1963, Ser. No. 313,302
1 Claim. (Cl. 32—63)

This invention relates to improvements in dental matrix bands and their usage.

Among the objects of the invention are to provide a dental matrix band which is reuseable, easy to install upon a tooth which has been prepared for a filling, readily removable therefrom without injury to the filling or adjacent tissue and adapted to maintain good contact between adjacent teeth by virtue of the fact that the applied band completely surrounds the tooth under preparation and does not apply excessive contracting pressure thereon.

The invention is deemed to be a distinct improvement over prior art matrix bands which are applied to teeth by means of screw-threaded vise or retainer means which tend to exert too much pressure upon the tooth, frequently resulting in a loss of proper tooth contact. Such prior art devices are also frequently bulky and heavy and therefore awkward to use and uncomforatable for the patient. The present invention in its entirety is lightweight with a minimum of bulk and therefore relatively comfortable to the patient. It is constructed for maximum convenience of manipulation and accuracy of work on the part of the dentist, and it is also quite economical to manufacture compared to certain prior art devices.

Another object of the invention is to provide a dental matrix band having novel and simplified means for detachably interconnecting the ends of the band when the band has been formed into a preliminary elongated loop for initial placement over a tooth, thereby greatly simplifying the subsequent steps of forming the band around the tooth into a completed matrix and also simplifying the reapplication of the completed matrix to the tooth and the securing thereof while on the tooth. The mentioned interconnecting means on the band also allows the use of a minimum amount of material in the band, thereby rendering the same further economical.

Another object is to provide a dental matrix band utilized with a simplified resilient securing means which cannot exert excessive gripping pressure upon the tooth resulting in the loss of proper tooth contact, the securing means being held against undesirable displacement on the band during the use thereof.

Other objects and advantages of the invention will be apparent to those skilled in the art during the course of the following description.

Figure 1:
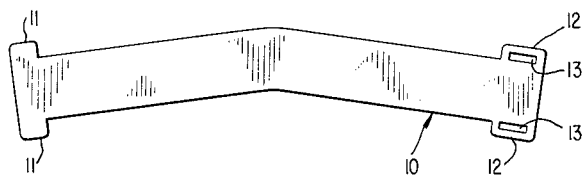
Figure 2:
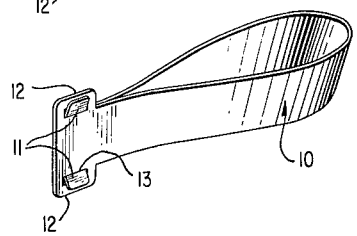
Figure 3:
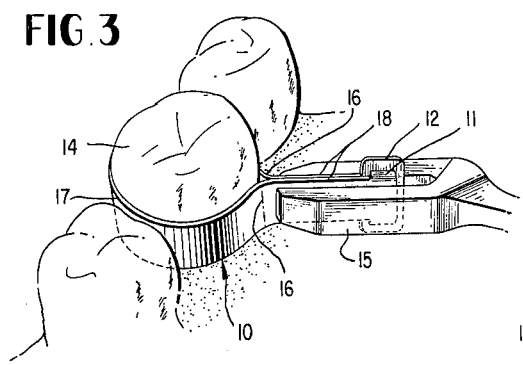
Figure 4:
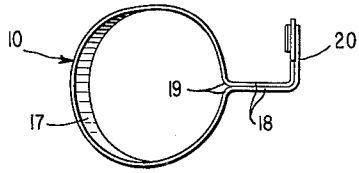
Figure 5:
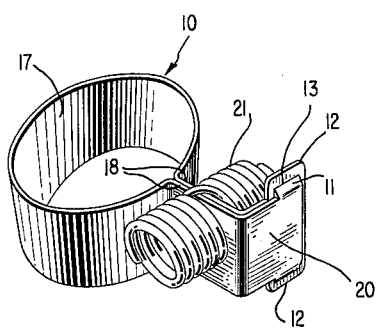
Figure 6:
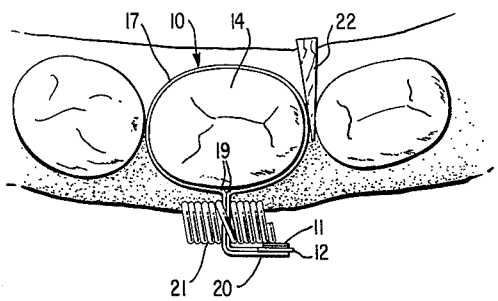

In the accompanying drawings forming a part of this application and in which like numerals are employed to designate like parts throughout the same, FIGURE 1 is a side elevational view of a dental matrix band embodying a major component of the invention, FIGURE 2 is a perspective view of the band after formation into a preliminary loop and with the ends thereof detachably interconnected, FIGURE 3 is a perspective view showing the preliminary application of the band to a tooth and the preliminary formation or bending of the band with pliers to produce the matrix, FIGURE 4 is a plan view of the band removed from the tooth and depicting complete formation thereof or final bending after removal, FIGURE 5 is a perspective view of the completely formed matrix band having the resilient securing means applied thereto prior to final placement of the band over the tooth, and FIGURE 6 is a plan view showing the replacement of the matrix band over the tooth after completion of the matrix band.

In the drawings, wherein for the purpose of illustration is shown a preferred embodiment of the invention, the numeral 10 designates an initially generally flat elongated thin stainless steel dental matrix band, preferably having a thickness of about .015 to .022 inch, as is customary. The precise configuration and dimensions of the band 10 may be varied somewhat in practice depending upon requirements, and one preferred shape for the band is shown in FIGURE 1, where the same has its opposite end sections angled at approximately 15 degrees below a theoretical tangent line at the longitudinal center of the band. While this configuration is desirable in many instances and also convenient, it is not critical to the successful operation of the invention and the band 10 may be straight or may have its shape otherwise modified slightly and it may be provided along one edge and near its center with enlarged area portions in some instances for reasons well known in the art.

The band 10, FIGURE 1, is provided at one end thereof with a pair of oppositely disposed relatively small generally rectangular lateral extensions or tabs 11 for an important and essential purpose to be described. The opposite end of the band 10 carries similar and slightly wider integral extensions 12 having parallel narrow slots 13 formed therethrough for the reception of the tabs 11 in detachable interlocking engagement as depicted in FIGURE 2.

In the use of the matrix band 10 by the dentist, the same is formed manually into a preliminary elongated loop as depicted in FIGURE 2 and the tabs 11 are introduced through the slots 13 to releasably secure the end portions of the band together in abutting relation and to maintain said elongated loop.

The looped band is now placed over a tooth 14, FIGURE 3, such as a tooth which has been prepared to receive a filling. The dentist may do this manually with the fingers and the attachment of the ends of the band by means of the tabs 11 and slots renders the operation very easy. Immediately thereafter, as shown in FIGURE 3, suitable pliers 15 are utilized to form the band substantially entirely around the tooth 14 in a preliminary manner and to form preliminary bends 16 therein at the ends of the loop 17 which is now no longer elongated but conforms to the shape of the tooth. In this condition, the band has radial extensions 18 which continue to be held together by the tab 11 and the slots 13.

The pliers are removed and the incompletely formed matrix band is now readily removed from the tooth 14 and the completion thereof is done outside of the mouth with pliers to produce the final or completed matrix band shown in FIGURE 4. In this figure, the completion of the substantially circular loop 17 is completed by utilizing pliers to produce final and more abrupt bends 19 at the ends of the loop 17 and to draw such ends more closely together as shown. Also, at this time, the end portions of radial extensions 18 are bent to one side preferably at right angles to the radial and while still connected by the tabs 11, as shown at 20, in FIGURE 4.

A small retractile coil spring 21 serving as a resilient clip is now placed over the radial extensions 18 in the regions thereof between the bent portions 20 and the loop 17 proper, FIGURE 5. The extensions 18 are engaged snugly between adjacent coils of the spring 21, as shown, preferably near the longitudinal center of the spring. This operation is performed outside of the mouth and the coil spring is large enough to render its manipulation with the fingers very easy and convenient. The distance between the vent-over portion 20 and the adjacent side of the loop 17 is such that the spring 21 cannot be shifted appreciably laterally thereon after installation. The spring 21 secures the extensions 18 firmly yet resiliently in opposed contacting relation so as to maintain the matrix loop 17 entirely closed.

The thus completed matrix band is now again placed over the same tooth 14 as shown in FIGURE 6 and will conform exactly to the shape of the tooth and snugly engage the same but without exerting excessive and undesirable constrictive pressure thereon, as frequently occurs with matrix bands utilizing screw clamps or vises and securing elements which require heavy pressure to close.

A wooden wedge 22 or wedges may be introduced between the tooth 14 and an adjacent tooth or teeth to further stabilize the matrix band during the filling operation. In some instances, it may be unnecessary to employ the wedge 22. In addition to stabilizing the band, the wedge compensates for the presence of the interproximal matrix band material.

Upon completion of the filling or other like work requiring the use of the matrix band, the same is readily removable from the tooth with relative ease as compared to certain other prior art devices. To remove the band, the wedge 22 if employed is first removed, the coil spring 21 is then removed and the tabs 11 may, if desired, be removed from the slots 13 to release the attached ends of the band. It may not always be necessary to unlock the tabs and slots prior to removal, but this is often done in order to facilitate removing the band from extensive restorations or fillings which have just been placed and are not completely hardened. The tabs and slots must be unlocked for easy straightening and rapid sterilization of the parts prior to reusing.

The band is readily reuseable because no part of the band at any time needs to be bent more than 90 degrees, as shown.

The invention avoids the bulk and weight associated with the usual screw type matrix retainers and this is advantageous for the patient as well as the dentist. The invention also promotes good, heavy interproximal contact because of its substantially complete circle design, as shown in FIGURE 6.

The invention herein resides not only in the simplified, compact and economical structure above-described but also in the method of using and manipulating the parts.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described my invention, I claim:

A reuseable and readily removable dental matrix device comprising a band having a substantially closed loop body portion to engage over and completely surround a tooth in snug-fitting relation thereto, radial end portions extending from one side of said loop body portion in opposed substantially contacting relation and including extension disposed substantially at right angles to the radial portions, means detachably securing said extensions together in opposed substantially contacting relation, and detachable resilient clamping means for said radial portions to maintain them together in contacting relation, said clamping means consisting of a coil spring receiving said radial portions of the band frictionally and clampingly between adjacent spring coils, said coil spring interposed between said extensions and loop body portion and maintained thereby against appreciable movement on said radial portions.

References Cited by the Examiner

UNITED STATES PATENTS

| 2,035,135 | 3/1936 | Lebow | 32—63 |
| 2,575,800 | 11/1951 | Eicher | 32—63 |
| 2,720,701 | 10/1955 | Tofflemire | 32—63 |
| 2,867,905 | 1/1959 | Meacham | 32—63 |

FOREIGN PATENTS

| 105,958 | 5/1917 | Great Britain. |

RICHARD A. GAUDET, *Primary Examiner.*

J. W. HINEY, JR., *Assistant Examiner.*